(12) United States Patent
Cadene

(10) Patent No.: US 7,835,770 B2
(45) Date of Patent: Nov. 16, 2010

(54) PORTABLE DEVICE WITH IMPROVED USER INTERFACE

(75) Inventor: Olivier Cadene, Mont morency (FR)

(73) Assignee: LG Electronics Inc., Seoul (KR)

( * ) Notice: Subject to any disclaimer, the term of this patent is extended or adjusted under 35 U.S.C. 154(b) by 948 days.

(21) Appl. No.: 11/627,346

(22) Filed: Jan. 25, 2007

(65) Prior Publication Data
US 2007/0182716 A1 Aug. 9, 2007

(30) Foreign Application Priority Data
Jan. 26, 2006 (EP) .................................. 06290161

(51) Int. Cl.
*H04M 1/00* (2006.01)
(52) U.S. Cl. ................... 455/566; 455/90.3; 455/575.1; 345/440
(58) Field of Classification Search ................. 455/566, 455/90.3, 575.1; 345/440
See application file for complete search history.

(56) References Cited

U.S. PATENT DOCUMENTS 6,957,397 B1 10/2005 Hawkins et al.
7,457,705 B2 * 11/2008 Takahashi et al. ........... 701/211
2005/0028086 A1 2/2005 Itavaara et al.
2005/0079895 A1 * 4/2005 Kalenius et al. ............. 455/566

FOREIGN PATENT DOCUMENTS

| EP | 1033644 | 9/2000 |
| WO | WO 02/03187 | 1/2002 |
| WO | WO 0241609 A1 * | 5/2002 |

* cited by examiner

*Primary Examiner*—Nghi H Ly
*Assistant Examiner*—Amancio Gonzalez
(74) *Attorney, Agent, or Firm*—Lee, Hong, Degerman, Kang & Waimey

(57) ABSTRACT

A portable device such as a mobile phone, comprising a display screen, an input interface having a plurality of activable elements and processing means in connection with the display screen and the input interface, wherein the value of at least one parameter of the device can be changed by means of the input interface, characterized in that the device is arranged for displaying on the display screen a plurality of parameters representations, each one of these parameters representations including: an identification of the parameter; and an indication of what particular activable element or elements are to be used for changing the value of the parameter.

21 Claims, 4 Drawing Sheets

PORTABLE DEVICE WITH IMPROVED USER INTERFACE

CROSS REFERENCE TO RELATED APPLICATION

Pursuant to 35 U.S.C. §119(a), this application claims the benefit of earlier filing date and right of priority to European Application No. 06290161.6, filed Jan. 26, 2006, the contents of which are hereby incorporated by reference herein in their entirety.

BACKGROUND OF THE INVENTION

1. Field of the Invention

The present invention relates to a portable device, such as a mobile phone, comprising a display screen, an input interface having a plurality of activable elements, such as keys of a keypad, and processing means in connection with the display screen and the input interface.

2. Description of the Related Art

On a portable device, it is conventional that at least one parameter of the device can be changed by means of the input interface, the up-to-date parameter value being shown on the display screen.

Such parameter value display on the display screen contribute to guiding the user in the configuration/personalization of his device.

The system implementing parameter value displays is called hereinafter "display interface".

A friendly display interface is a key element for service usage from a mobile phone, in particular with an application requiring several parameters to be adjusted or tuned.

In this regard, there are mobile applications which need configuration from the user in a short time (e.g. a camera application where the user needs to adjust parameters such as zoom, picture size, brightness etc. while people in the scene keep waiting).

At the same time, a conventional display interface typically uses hierarchical menus and this requires many keystrokes for configuration.

In addition, the user cannot change several parameters at one time, which can become problematic when several parameters are correlated together.

Meanwhile the input interfaces (keypads, . . . ) of known mobile phones have not evolved a lot in the last years, and the localization of their individual elements are somewhat standardized (e.g. digit and "#" and "*" keys).

On the other hand the display screens of mobile phones have been substantially improved with support of colors and increased resolution.

The present invention seeks to take benefit of such standard keypad and improved display and to allow to simply and intuitively adjust or tune at least two parameters with simultaneous display of the parameter values.

SUMMARY OF THE INVENTION

Therefore, an object of the present invention is to provide a portable device that allows to quickly and intuitively adjust or tune at least two parameters of an application or any other functionality and visually check them simultaneously.

To achieve these and other advantages and in accordance with the purpose of the present invention, as embodied and broadly described herein, there is provided a portable device such as a mobile phone, comprising a display screen, an input interface having a plurality of activable elements and processing means in connection with the display screen and the input interface, wherein the value of at least one parameter of the device can be changed by means of the input interface, characterized in that the device is arranged for displaying on the display screen a plurality of parameters representations, each one of these parameters representations including an identification of the parameter; and an indication of what particular activable element or elements are to be used for changing the value of the parameter.

Preferably, the input interface comprises a keypad with a plurality of depressable keys together with a marking of respective symbols, and wherein said indications include the key symbols of keys to be used for changing the associated parameter.

Preferably, the input interface comprises a keypad with a plurality of depressable keys in a geometrical array, and wherein said indications include the positions of the parameters representations in said display screen, which indicate the positions of the keys to be used for changing said parameter values, respectively.

Preferably, the input interface comprises a keypad with a plurality of depressable keys which can be illuminated in different colors, and wherein said indications include colors in the parameters representations in said display screen, which indicate the keys illuminated in the same colors as those to be used for changing said parameters values, respectively.

Preferably, the input interface comprises a keypad with a plurality of depressable keys which can be illuminated in different colors, and wherein said identifications include colors in the parameters representations in said display screen, which indicate the keys illuminated in the same colors as those to be used for changing said parameter value, respectively.

Preferably, the input interface comprises a directional key, wherein the device is further arranged so that one parameter among the plurality of parameters is selectable by using the directional key, and wherein the positions of the parameters representations in said display screen indicate the directions in which the directional key should be used for selecting one among the plurality of parameters.

BRIEF DESCRIPTION OF THE DRAWINGS

Other aspects, features and advantages of the present invention will appear more clearly from the following description of a preferred embodiment thereof, made with reference to the appended drawings in which.

DETAILED DESCRIPTION OF PREFERRED EMBODIMENTS

Figure 1A:
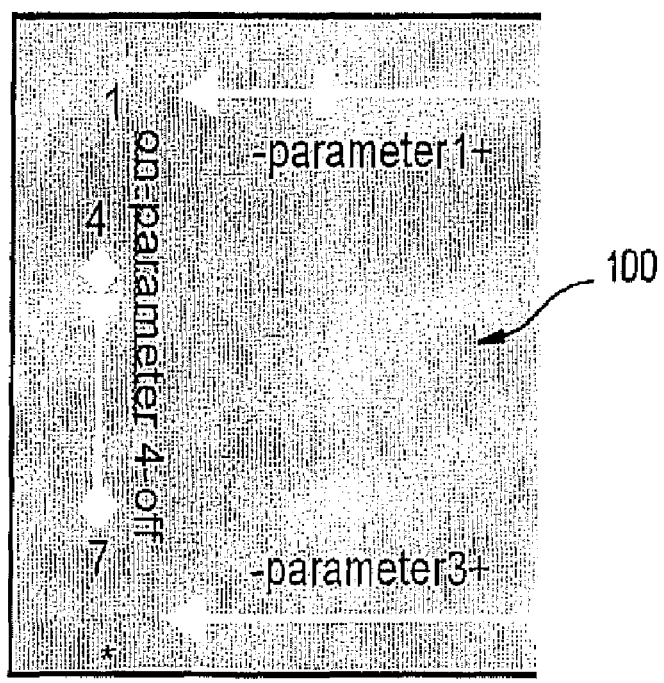
FIGS. 1A and 1B diagrammatically show relevant portions of a first device according to the present invention.
Figure 1B:
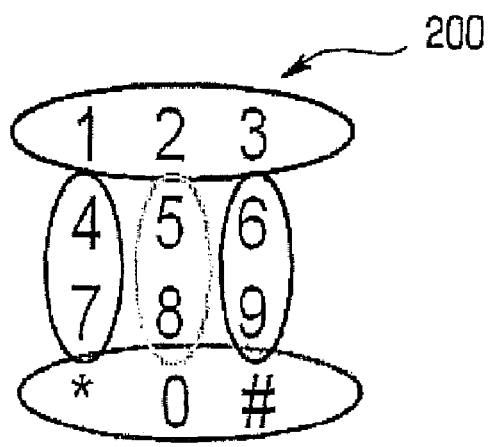

FIGS. 1A and 1B diagrammatically show relevant portions of a first device according to the present invention (respectively a display screen displaying parameters representations and a keypad).

Figure 2A:
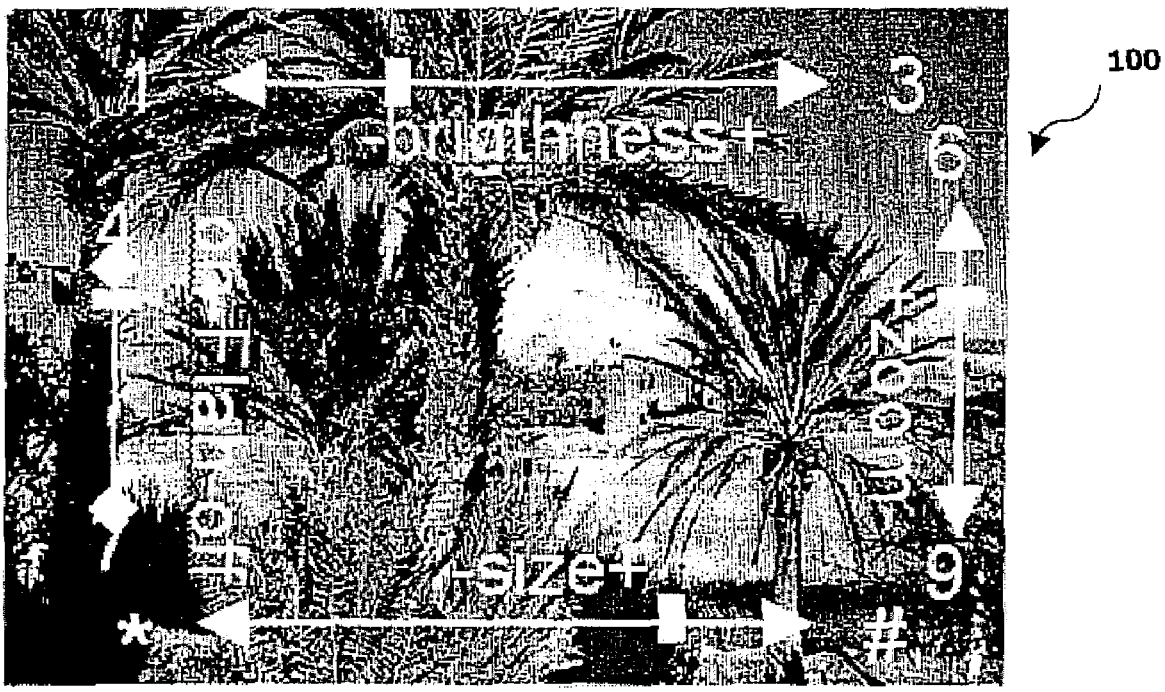
FIGS. 2A, 2B and 2C diagrammatically show relevant portions of a second device according to the present invention.
Figure 2B:
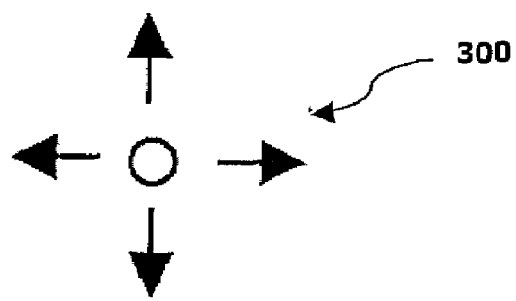
Figure 2C:
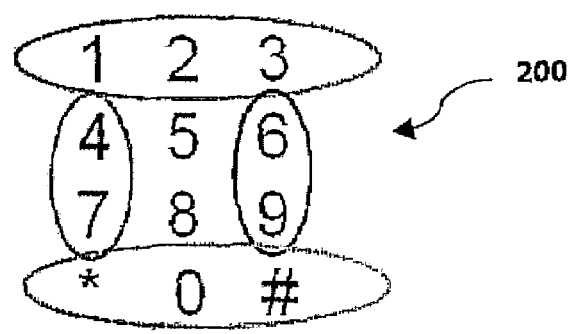

FIGS. 2A, 28 and 2C diagrammatically show relevant portions of a second device according to the present invention (respectively a display screen displaying parameters representations, a track point or navigation key, and a keypad) in a first embodiment.

Figure 3A:
FIGS. 3A, 3B and 3C diagrammatically show relevant portions of the second device according to the invention
Figure 3B:
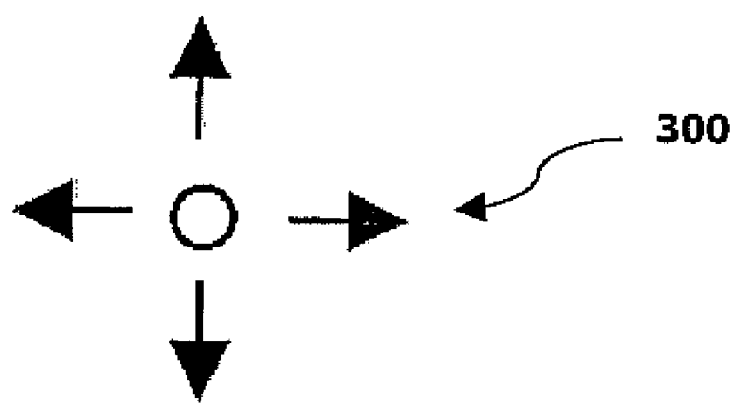
Figure 3C:
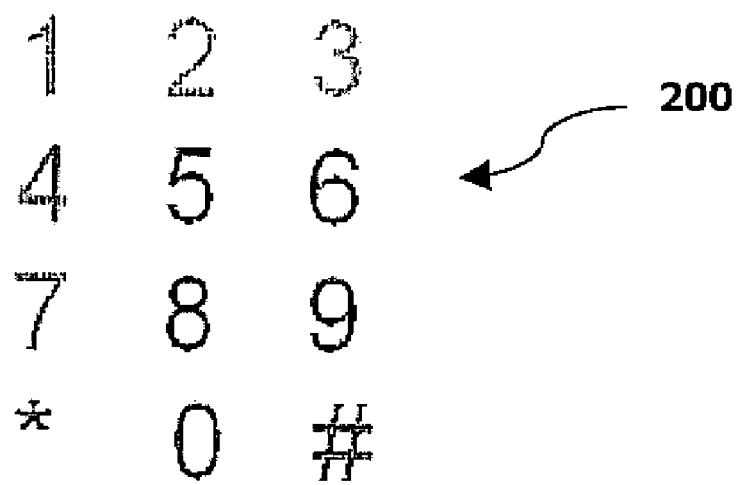

FIGS. 3A, 3B and 3C diagrammatically show relevant portions of the second device according to the invention (respectively a display screen displaying parameters representations, a track point or navigation key and a keypad) in a second embodiment thereof. It will be noted here that the different hatchings of the parameter names in FIG. 3A and the digits in FIG. 3C are meant to represent different backlight colors.

Now referring to the drawings, a portable device according to the present invention comprises:
- a display screen 100, preferably a color display,
- an input interface, such as a keypad 200 and/or a track point or navigation key 300,
- processing and memory means in connection with the display screen 100 and the input interface.

Other elements or parts of the device such as microphone, transducer, camera, telephone circuits, battery, etc. may be of conventional type and will not be described further.

The input interface comprises a series of individually activable elements such as buttons or keys to be depressed.

The association between individual keys and their actions are defined by software in a manner conventional per se.

Some of these actions relate to the tuning or adjustment of parameters involved in applications or other functionalities of the device.

The display screen 100 is used for displaying a visual interface in which parameter-related information can be shown.

More particularly, according to one aspect of the present invention, the following features can be shown to the user on the display:
- which parameters are currently editable or adjustable; to this end, the parameters representations include parameter identification or designation;
- which activable elements or elements of the input interface are associated with each one of the currently modifiable parameters, these activable elements being used to modify the value of the associated parameter; for this purpose, the parameters representations include indications of the activable elements they are each associated with.

One or several individual elements of the input interface can be associated to a given parameter.

As indicated above, the input interface can include as activable elements the keys of a keypad and the different positions or states (typically four directional positions and a depressed state) of a track point or navigation key.

These two input interface devices may be active at the same time to adjust the parameters.

Alternatively, only one of them may be active.

Keypad Mapping

In a first embodiment, The parameters representations on display 100 include indications showing the user which key or keys of the keypad 200 need to be depressed for modifying the associated parameter by a determined value.

Optionally, at least one parameter representation is located in the display area in a region which corresponds to a region of the keypad 200 in which the above-mentioned key or keys are located.

The way of modifying the parameters is thus intuitive for the user, the latter using the keys of the keypad 200 which are located in the regions corresponding to the regions of parameter representations.

For example, and as shown in FIGS. 1A and 1B, a parameter representation located along the right side of the display will indicate to the user keys "6" and "9", located on the right of the keypad, should be used for adjusting this parameter.

The parameter representation may further or alternatively include the key symbols of the keys to be used for changing the associated parameter, whether the keys correspond to digit or non-digit symbols.

In the present example, the "6" and "9" symbols included in the representation of parameter 2 gives a further indication that keys "6" and "9" allow to modify said parameter 2.

In a similar manner, "*", "#" located at the bottom of the keypad are associated with references are associated with parameter 3.

In a different embodiment, a parameter appearing vertically along the right side of the display area means that the "3", "6", "9", "#" keys may be used for adjusting this parameter. Similarly, a parameter representation displayed horizontally along the top edge of the display indicates to the user that the "1", "2", "3" keys are to be used for adjusting this parameter.

When several parameters are simultaneously displayed, a visible mark or highlighting effect on the parameter representation may indicate which is the "active" or selected" parameter, i.e. the parameter which may currently be adjusted.

According to other optional features, a parameter representation may include a graphical indication of a way to increase or decrease the parameter value by a given factor (e.g. by tens instead of units), and/or include "+" and "−" symbols, and/or an arrow oriented in the direction of increasing and/or decreasing parameter value.

Preferably, the functions of the keypad keys or navigation key positions are such that the user will intuitively "guess" such function. For instance, when the "6" and "9" keys are associated to a parameter, the "6" located above the "9" is used for increasing the parameter value, while the "9" located below the "6" is used for decreasing the value.

When a parameter is associated with 2 keys, the keys are used for increasing and decreasing the parameter value by a given value (e.g. a unit). Now when 3 or more keys are associated with a parameter, a possible approach is as follows:
- a first key allows the user to increase the parameter value by a given value each time it is depressed;
- a second key associated allows the user to decrease the parameter value by said given value each time it is depressed;
- a third (and possibly a fourth) key allows the user to select a single value which is an intermediate value in the range of parameter values.

The functions of the keys in such case may be indicated on the display screen or not. For instance, the symbol of the third (and fourth) key may be displayed together with an indication of what parameter value it will generate when depressed.

Preferably, the keys are arranged in the most logical order for that purpose.

For example, when the "3", "6", "9" and "#" keys are dedicated to the adjustment of a parameter, key "#" may be used to decrease the value by a predefined amount of units, key "3" may be used to increase the value by a predefined amount of units, key "6" may be used to select a value of ⅔ of the full range of parameter values, and key "9" may be used to select a value of ⅓ of said range.

According to a further example, if the number of keys dedicated to a parameter is equal to the number of values that the parameter can take, then a 1:1 mapping may be used (e.g. if "3", "6", "9", "#" keys are used, key "3" may be used to select the top value of the range, key "6" may be used to select a value of ⅔ of the range, key "9" may be used to select a value of ⅓ of the range, and key "#" may be used to select the lowest value of the range).

According to still another example, when a parameter can only take one among two values (e.g On/Off), a single button may be associated with the parameter. Successive depressions of the key then allow to toggle between the two values. The parameter representation includes in this case the indication of the symbol of the associated key.

As a further improvement, the device according to the present invention can be arranged for further allowing the user to switch between different sets of parameters to be adjusted (cf. FIG. 1A). As an example, depressing key "5" will show a previous set of parameters including other parameters to be adjusted, while depressing key "8" will show a next set of parameters to be adjusted.

Preferably, each set of parameters is grouped in a family of application parameters, different from other sets, each set being adapted to a specific application or to a specific function in an application.

Instead of using keys, the user may also use the track point or navigation key 300, if available (i.e. not used for parameter adjustment), to switch between different sets of parameters to be adjusted.

The device is preferably capable of showing on the display screen indications of which keys should be used for switching between parameter sets.

Track Point or Navigation Key Mapping

A track point or navigation key commonly has four directional positions or keys ("up", "down", "right", "left") and may be used for selecting which parameter is to be adjusted among a plurality of parameters having representations on the display.

More particularly, the user maneuvers the directional key in the direction of the displayed representation on the parameter he desires to adjust. For instance, if a parameter representation (name and/or icon) is displayed vertically along the right edge of the display, then a right push or depression on the track point or navigation key will select this parameter for adjustment.

As explained in the foregoing, an adequate visual effect such as a highlighting effect in a different color is used to indicate which parameter is currently selected for adjustment.

The selected parameter can then be adjusted, either by means of certain keys of the keypad as described above, or by using a directional key or track point.

Preferably, the parameter representation on the display includes an indication that directional key or track point should be used for parameter value adjustment, and also an indication of the direction or directions of maneuvering for increasing and decreasing this value by a given unit.

For example an arrow or a double arrow in the representation may indicate to the user both that a directional key or track point is required and in which directions it should be maneuvered for increasing or decreasing the value of the parameter.

A further adjustment possibility is that a push of the navigation key perpendicular to the arrow and corresponding to the location of the parameter representation on the display will allow to select the medium value of the range of parameter values For example and referring to FIGS. 2A-2B-2C, a bottom push of the track point or navigation key 300 will select the "size" parameter, then a right push of the track point or navigation key 300 will increase the value by a predefined amount of units, while a left pressure of the track point or navigation key 300 will decrease the value by a predefined amount of units. A bottom pressure is used to select the medium value of the range.

Display Screen 100

A parameter representation may be displayed with different form factors as shown in the figures, or may not be displayed at all.

All the parameters representations (see FIG. 1A) may be associated with a keypad area or only part of it.

Several combinations may be used to define the mapping between the displayed parameter representation and the keypad 200 and/or the track point or navigation key 300, as illustrated by the examples in FIGS. 1A, 2A, 3A.

When the keypad of the equipment has a backlight unit, another possible mapping consists providing the keys allocated to different parameters with different backlight colors. Preferably, there is an association between colors in the parameter representations (e.g. of the parameter names) and backlight colors of the respective keys for adjustment (cf. FIG. 3C).

According to another variant, while "+" and "−" are the normal signs for indicating which keys are to be depressed for increasing or decreasing the value of a parameter, other possible ways are:
- to make the color darker for the higher values of the parameter, and lighter for smaller values;
- to use a form factor in the parameter representation (e.g. a line linking a small point to a big point);
- etc.

The invention can be applied in any application where it is desired to avoid hierarchical menus for adjusting or tuning parameters one after another, and where it is desired to have a plurality of parameter representations at the same time on the display, with the corresponding parameter values.

For example, the invention can be applied to a mobile phone including a camera for adjustment of image parameters such as zoom in/zoom out, picture size and resolution, brightness, capture speed, etc.

Advantageously, for image-related parameters, the picture is displayed In the background. The effect of parameter changes may be reflected in the displayed picture when appropriate.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A portable device comprising:
   a display screen;
   an input interface comprising a plurality of elements that can be activated; and
   a processing means controlling the display screen and the input interface,
   wherein a value of at least one parameter of the portable device can be changed via the input interface,
   wherein the processing means is configured to display a plurality of parameter representations on the display screen, each of the plurality of parameter representations comprising:
   an identification of a corresponding one of the at least one parameter, and an indication of at least one of the plurality of elements to be used for changing the value of the corresponding one of the at least one parameter, and wherein the identification or the indication comprises a color that matches a color used to illuminate the at least one of the plurality of elements to be used for changing the value of the corresponding one of the at least one parameter.

2. The device of claim 1, wherein:

the input interface comprises a keypad and the plurality of elements are depressible keys of the keypad, each of the keys marked with a symbol; and the indication comprises at least one symbol corresponding to one of the keys to be used for changing the value of the corresponding one of the at least one parameter.

3. The device of claim 2, wherein the symbol corresponding to each of the keys comprises digits and non-digit symbols.

4. The portable device of claim 1, wherein:

the input interface comprises a keypad and the plurality of elements are keys of the keypad arranged in a geometrical array, and the indication comprises a position of at least one of the plurality of parameter representations displayed on the display screen that corresponds to a position of at least one of the keys to be used for changing the value of the corresponding one of the at least one parameter.

5. The portable device of claim 1, wherein the input interface comprises a keypad and the plurality of elements are keys of the keypad that can be illuminated using different colors.

6. The portable device of claim 1, wherein:

the input interface further comprises a directional key, configured to enable selection of the at least one parameter, and positions of the plurality of parameter representations on the display screen indicate directions in which the directional key should be moved for selecting one of the plurality of parameter representations.

7. The portable device of claim 6, wherein the processing means is further configured to display a visible mark or a highlighting of a currently selected one of the plurality of parameter representations on the display screen.

8. The portable device of claim 1, wherein:

the input interface further comprises a directional key or track point, and the indication includes an orientation of one of the plurality of parameter representations displayed on the display screen for indicating directions in which the directional key or track point should be moved for changing the value of the corresponding one of the at least one parameter.

9. The portable device of claim 1, wherein one of the plurality of elements causes an increase or a decrease of the value of the corresponding one of the at least one parameter by a predefined amount.

10. The portable device of claim 1, wherein one of the plurality of elements causes the value of the corresponding one of the at least one parameter to be fixed at a predetermined value.

11. The portable device of claim 10, wherein one of the plurality of parameter representations corresponding to the one of the plurality of elements indicates the predetermined value.

12. The portable device of claim 1, wherein each of the plurality of parameter representations comprises two cursors and cursor lines along lateral edges of the display screen, wherein each of the two cursors indicates a current value of one of the at least one parameter corresponding to the corresponding one of the plurality of parameter representations.

13. The portable device of claim 1, wherein each of the plurality of parameter representations comprises cursors and cursor lines along edges of the display screen, wherein each of the cursors indicates a current value of one of the at least one parameter corresponding to the corresponding one of the plurality of parameter representations.

14. The portable device of claim 12, wherein each of the cursor lines are ended by at least one arrow.

15. The portable device of claim 12, wherein the cursor lines each comprise a same shape and are repeated with increasing size along a direction.

16. The portable device of claim 12, wherein each of the cursor lines are progressively darker along a direction.

17. The portable device of claim 1, wherein at least one of the plurality of elements causes switching between different parameter sets to be displayed and the display screen includes an indication of the at least one the plurality of elements.

18. The portable device of claim 1, wherein the identification includes a name or an icon representing the corresponding one of the at least one parameter.

19. The portable device of claim 1, further comprising a keypad and a directional key or track point which can be activated concurrently or individually.

20. The portable device of claim 1, further comprising a camera, wherein the at least one parameter includes camera-related parameters.

21. The portable device of claim 1, wherein the processing means is configured to further display a background image on the display screen.

* * * * *